(12) United States Patent
Rogers

(10) Patent No.: US 6,757,467 B1
(45) Date of Patent: Jun. 29, 2004

(54) OPTICAL FIBER SYSTEM

(75) Inventor: Philip L. Rogers, Fauquier County, VA (US)

(73) Assignee: Optical Air Data Systems, LP, Manassas, VA (US)

( * ) Notice: Subject to any disclaimer, the term of this patent is extended or adjusted under 35 U.S.C. 154(b) by 0 days.

(21) Appl. No.: 09/625,243

(22) Filed: Jul. 25, 2000

(51) Int. Cl.$^7$ .............................. G02B 6/22; G02B 6/26
(52) U.S. Cl. ............................ 385/126; 385/31; 385/47
(58) Field of Search ................................ 385/123–128, 385/147, 15, 31, 33, 47

(56) References Cited

U.S. PATENT DOCUMENTS

| | | | | |
|---|---|---|---|---|
| 4,070,091 A | * | 1/1978 | Taylor et al. | |
| 4,443,700 A | * | 4/1984 | Macedo et al. | |
| 4,676,584 A | * | 6/1987 | Perlin | |
| 5,037,172 A | * | 8/1991 | Hekman et al. | 385/31 |
| 5,757,994 A | * | 5/1998 | Schoenwald et al. | 385/44 |
| 5,854,865 A | * | 12/1998 | Goldberg | 385/31 |
| 5,926,592 A | * | 7/1999 | Harris et al. | 385/33 |
| 5,999,670 A | * | 12/1999 | Yoshimura et al. | 385/31 |
| 6,411,755 B1 | * | 6/2002 | Erdogan | 385/28 |

\* cited by examiner

Primary Examiner—Hemang Sanghavi
Assistant Examiner—Juliana K. Kang
(74) Attorney, Agent, or Firm—Clark & Brody

(57) ABSTRACT

An optical fiber has a small diameter core for transmitting one or more wavelength multiplexed first light signals in a first direction, and an inner cladding for transmitting a second light signal in the opposite direction. A lower-index outer cladding or buffer is used to confine the second signal in the first cladding. The diameter of the core may be less than about ten microns. A notch, prism or other suitable device extends into the first cladding and is used to reflect the second signal into an input/output fiber. The reflective device may also be used to input additional light energy into the first optical fiber, to thereby augment an outgoing beam. The optical fiber system may be used in combination with a multi-function signal generating system mounted on an aimable device. A lens device may be used to collimate the outgoing beam and to converge a reflected return beam onto the end of the first fiber.

41 Claims, 2 Drawing Sheets

OPTICAL FIBER SYSTEM

FIELD OF THE INVENTION

The present invention relates generally to optics, optical fibers, and optical systems and devices. The present invention also relates to a multi-function optical fiber system.

BACKGROUND OF THE INVENTION

Multi-function laser-based systems are employed for a variety of purposes. For example, it has been suggested to provide up to seven different laser-based equipment systems in combination, including the following: (1) a laser range finder; (2) an infrared aim light; (3) an infrared illuminator (a flashlight); (4) a visible aim light; (5) a visible bore light (a mandrel boresight laser for aligning sights); (6) a combat identification system; and (7) a multiple integrated engagement system for laser-tag simulated exercises.

Prior art multi-function laser-based systems are generally complex and bulky. There is a need in the art for a system in which components are combined and/or eliminated to reduce complexity, cost and overall weight. In particular, there is a need for an optical system which provides multiple functions with a reduced number of optical sources and/or other components. As the number of components in such systems are reduced, however, it becomes difficult to provide sufficient optical power for certain functions. Thus, there is also a need in the art for a system that efficiently receives and transmits light energy, using a reduced number of components.

SUMMARY OF THE INVENTION

The disadvantages of the prior art are overcome to a great extent by the present invention. The present invention relates to an optical fiber that has a core and at least first and second claddings. The core is used to transmit one or more first light signals in a first direction. The first, inner cladding is used to transmit a second light signal in the opposite direction. The second cladding is used to confine the second signal in the first cladding. A notch, prism or other suitable device, extending into the first cladding, is used to direct the second signal into a second, input/output fiber.

According to one aspect of the invention, the index of refraction of the core is greater than the index of refraction of the first cladding, and the index of refraction of the first cladding is greater than the index of refraction of the second cladding.

According to another aspect of the invention, the transmission fiber may be a double-clad optical fiber designed for single mode operation in the 1550 nanometer wavelength range. The diameter of the core in the transmission fiber is preferably less than about ten microns, and the second cladding may be a buffer layer formed of polymeric material.

The present invention also relates to an optical system made up of a single mode optical transmission fiber, a multi-function signal generating system for launching a wavelength multiplexed transmission signal into the fiber core, and an input/output fiber for receiving a return signal from the cladding of the transmission fiber. According to this aspect of the invention, the core of the input/output fiber has a greater diameter than that of the transmission fiber.

According to another aspect of the invention, the transmission fiber has a reflective surface for directing the return signal out of the first cladding and into the core of an input/output fiber. The reflective surface (which may be in the form of an air/glass interface) may be located in a portion of the first cladding. The reflective surface preferably does not intersect the core of the transmission fiber.

According to yet another aspect of the invention, the return signal is detected at the distal end of the input/output fiber. The detection of the output signal may be correlated with other operational signals to determine a desired parameter, such as the distance to a target, for example.

According to yet another aspect of the invention, a second laser light source may be provided for supplying additional light energy into the transmission fiber. The additional light energy may be coupled into the first cladding of the transmission fiber, where it may be used to augment an outgoing beam that is collimated by a lens device. If desired, the lens device may be same one that is used to converge the return beam onto the outgoing end of the transmission fiber.

The present invention also relates to a method of operating an optical system. According to a presently preferred method, a first light signal (which may be a wavelength multiplexed signal) is propagated through a core of a single mode transmission fiber. A second light signal (which may be a reflected portion of the first signal) is simultaneously propagated through a cladding portion of the transmission fiber in the opposite direction. The second signal is reflected into a large diameter core of a multi-mode input/output fiber. In addition, the same reflective surface may be used to reflect additional light energy into the cladding of the transmission fiber.

According to one aspect of the invention, the optical system may be mounted on a hand-held aimable device, such as a rifle or binoculars. As such, the direction of the outgoing beam, as well as the origin of the return beam, may be determined by the direction in which the aimable device is aimed.

These and other advantages and features of the invention will become apparent from the following detailed description of the invention which is provided in conjunction with the accompanying drawings.

DETAILED DESCRIPTION OF PREFERRED EMBODIMENTS

Figure 1:
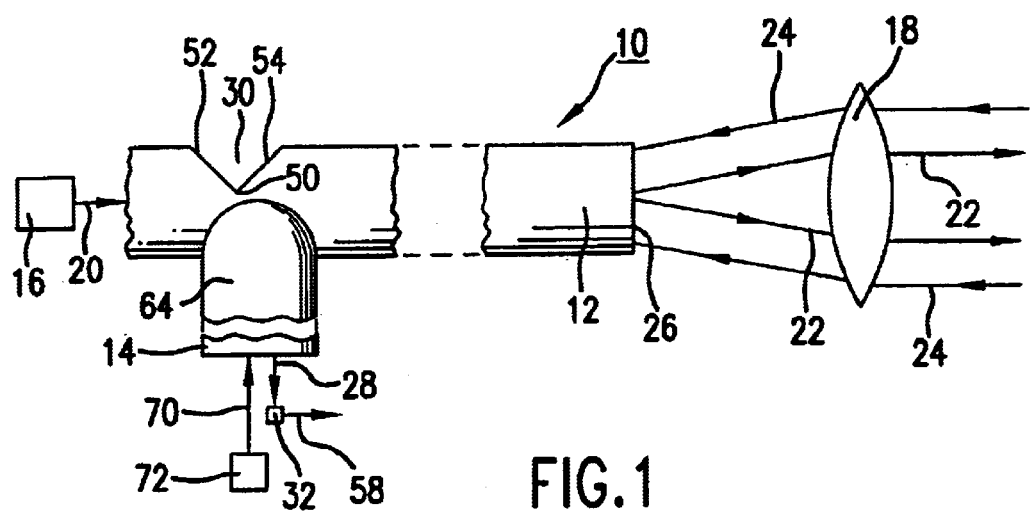
FIG. 1 is a side view of an optical system constructed in accordance with one embodiment of the present invention.

Referring now to the drawings, where like reference numerals designate like elements, there is shown in FIG. 1 an optical system 10 constructed in accordance with a preferred embodiment of the invention. The illustrated system 10 has an optical transmission fiber 12, an optical input/output fiber 14, a signal generating system 16, and a lens device 18. In operation, a laser light signal 20 is launched into the transmission fiber 12 by the signal generating system 16. The signal 20 is transmitted through the fiber 12 and forms an outgoing beam 22 incident on the lens device 18. A return beam 24 is converged by the lens device 18 onto the end 26 of the transmission fiber 12, and is thereby launched as a return signal 28 into the transmission fiber 12. As explained in more detail below, the return signal 28 is reflected by a notch 30 (FIG. 2) into the input/output fiber 14 (FIG. 3), which outputs the signal 28 to a suitable photodetector 32.

The illustrated transmission fiber 12 has a small diameter core 40, a first cladding 42 and a second cladding 44. The diameter of the core 40 may be, for example, in the range of from about six microns to about ten microns. In the embodiment shown in FIG. 3, the diameter of the core 40 is about eight microns. The present invention should not be limited, however, to the preferred embodiments shown, and described in detail herein. The diameter of the first cladding 42 may be much greater than the diameter of the core 40. The diameter of the first cladding 42 may be, for example, greater than about eighty microns. In the illustrated embodiment, the diameter of the first cladding 42 is about one hundred twenty five microns.

The refractive index of the core 40 is greater than the refractive index of the first cladding 42. The core 40 may be doped with a positive dopant, for example, to provide the higher index of refraction. The refractive index profile of the transmission fiber 12 may be arranged such that the light signal 20 is propagated in single mode through the core 40. The first cladding 42 operates to confine the signal 20 substantially within the core 40.

Thus, in operation, the signal 20 is launched by the signal generating system 16 into the core 40. The wavelength of the signal 20 may be about 1550 nanometers. The signal 20 is then propagated in single mode through the core 40 (from left to right as viewed in FIG. 3) and is output from the core 40 through the fiber end 26. In the transmission fiber 12, since the signal 20 is mostly confined within the core 40, the strength of the signal 20 is not substantially affected by the notch 30. As the signal 20 passes out of the core 40 through the fiber end 26, it forms the outgoing, diverging beam 22. The beam 22 may be collimated by the lens device 18. The lens device 18 may be formed of one or more refractive tenses, as desired.

Figure 2:
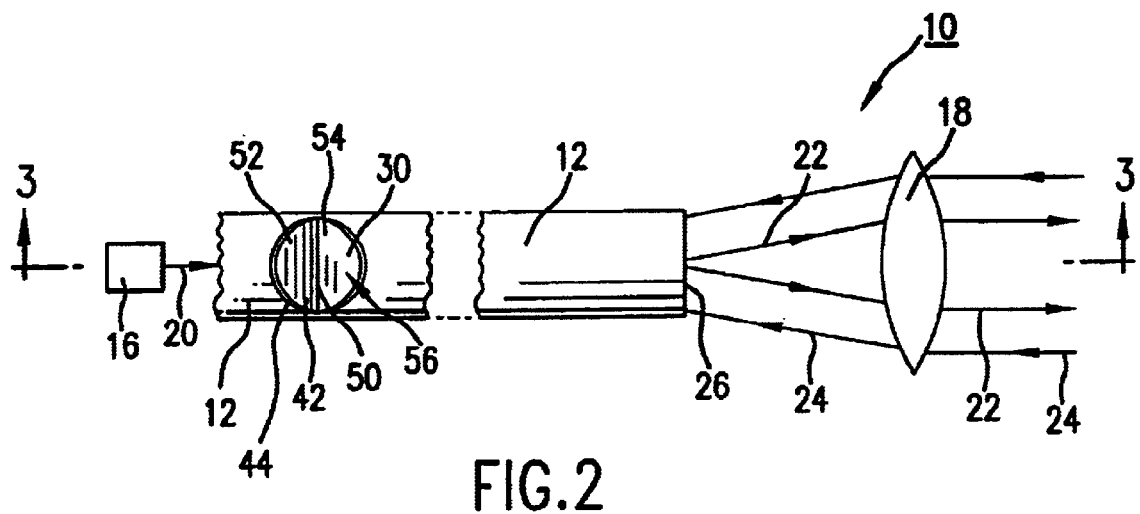
FIG. 2 is a top view of the optical system of FIG. 1.
Figure 3:
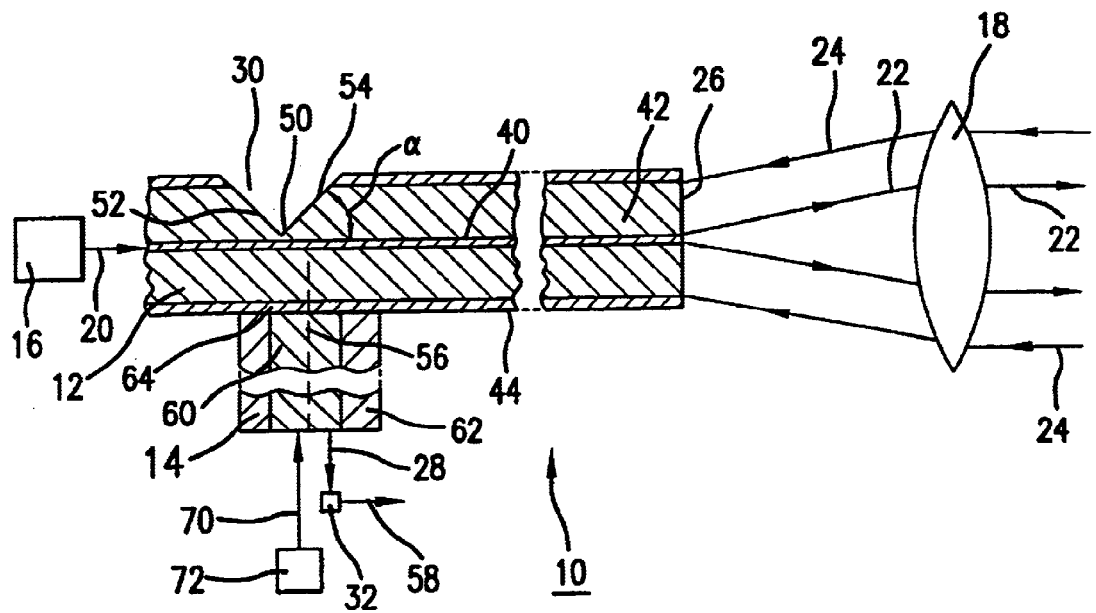
FIG. 3 is a cross sectional view of the optical system of FIG. 1, taken along line 3—3 of FIG. 2.

The notch 30 (or prism) may be constructed, if desired, in the manner shown in U.S. Pat. No. 5,854,865 (Goldberg). The entire disclosure of the Goldberg '865 patent is incorporated herein by reference. Thus, as shown in FIGS. 2 and 3, the illustrated notch 30 has a centerline 50, and there are two sides 52, 54 extending from the centerline 50. The centerline 50 is located close to the core 40, but it does not intersect the core 40. In the illustrated embodiment, the centerline 50 is located as close to the core 40 as possible or practicable. The centerline 50 should be positioned to maximize the amount of return light 28 reflected into the input/output fiber 14 without substantially affecting the propagation of light 20 through the core 40.

The front side 54 of the notch 30 may form an angle α of about forty five degrees with respect to the optical axis of the transmission fiber 12. The center of the front side 54 of the notch 30 may be aligned with the optical axis 56 of the input/output fiber 14 to optimize the amount of return light 28 that is reflected into the core 60 of the input/output fiber 14. Although the front side 54 of the notch 30 is shown in the drawings with a flat reflective surface, the surface may alternatively be curved or stepped. The inclination, configuration and position of the front side 54 of the notch 30 may be selected to optimize the amount of return light energy that is reflected into the optical input/output fiber 14.

The index of refraction of the second cladding 44 of the transmission fiber 12 is less than the index of refraction of the first cladding 42. The second cladding 44 may be in the form of a thin buffer layer of polymer resin having a low index of refraction. Such buffer layers are known per se in the art. The second cladding 44 helps to optically confine the return signal 28 in the first cladding 42. The return signal 28 is propagated in a multi-mode or cladding mode fashion through the first cladding 42 (from right to left as viewed in FIG. 3), and it is not necessary for the lens device 18 to focus the return beam 24 precisely on the end of the small diameter core 40. Light incident anywhere across the entire surface of the end 26 of the double clad fiber 12, within the perimeter of the first cladding 42, may be propagated through the transmission fiber 12 toward the notch 30. As a result, a greater amount of light energy can reach the detector 32, which increases the reliability and/or signal-to-noise ratio of the detector output 58.

In operation, the return beam 24 (which may be a reflection of the outgoing beam 22) is converged onto the end 26 of the transmission fiber 12 by the lens device 18. The beam 24 forms a return signal 28 that propagates through the first cladding 42 (from right to left as viewed in FIG. 3). The return signal 28 is substantially confined within the first cladding 42 by the second cladding 44. The return signal 28 is reflected by the front side 54 of the notch 30 (an air/glass interface) and is thereby directed into the large diameter core 60 of the input/output fiber 14. Since the notch 30 extends only partially into the transmission fiber 12, much of the return signal 28 is transmitted under and past the notch 30 and is not reflected into the input/output fiber 14. Even though the non-reflected portion of the signal 28 is wasted (it does not reach the detector 32), the system 10 still provides an improved signal response at the detector 32 because more of the incoming beam 24 can be transmitted into the fiber 12 than would be possible if the signal 28 could be transmitted only through the small diameter core 40.

The diameter of the core 60 of the input/output fiber 14 may be substantially greater than that of the transmission fiber core 40. Whereas the transmission fiber 12 is characterized bed single mode transmission in the small diameter core 40, the input/output fiber 14 supports multi-mode transmission in its larger diameter core 60. The diameter of the multi-mode core 60 may be, for example, greater than sixty microns. In the embodiment shown in FIG. 3, the diameter of the core 60 is about one hundred microns. The core 60 is surrounded by a cladding 62. The index of refraction of the core 60 is greater than that of the cladding 62. The cladding 62 substantially confines the return signal 28 in the core 60.

The end 64 of the input/output fiber 14 may have a cylindrical surface that mates closely with the exterior cylindrical surface of the second cladding 44 of the transmission fiber 12. The two fibers 12, 14 may be connected to each other by a suitable transparent adhesive. Thie optical axis 56 of the input/output fiber 14 may be approximately perpendicular to the optical axis of the transmission fiber 12, if desired. As noted above, however, the present invention should not be limited to the particular arrangements and constructions shown and described herein.

Providing the input/output fiber 14 with a large core 60 is advantageous because it makes it relatively easy to input a large amount of light into the fiber 14 from the reflective front side 54 of the notch 30. If the core 60 of the input/output fiber 14 were smaller, then less energy of the return signal 28 would reach the detector 32. Other advantages of the illustrated input/output fiber 14 are described below.

In a preferred embodiment of the invention, the signal generating system 16 is arranged to generate a variety of optical signals in the manner described in U.S. patent application Ser. No. 09/549,497 filed Apr. 14, 2000. The entire disclosure of U.S. patent application Ser. No. 09/549,497 is incorporated herein by reference. Thus, the system 16 may be used to generate modulated light energy of different wavelengths for one or more of the following functional systems: (1) a laser range finder; (2) an infrared aim light; (3) an infrared illuminator (a flashlight); (4) a visible aim light; (5) a visible bore light (a mandrel boresight laser for aligning sights); (6) a remote identification system; and (7) an integrated engagement system for laser-tag simulated exercises. The various light signals 20 generated by the signal generating system 16 (for example, with a visible component and components having wavelengths of about 980 nanometers and 1550 nanometers) may be wavelength multiplexed in the core 40 of the transmission fiber 12.

The system 10 may be mounted on a rifle (not shown), on binoculars, or on another aimable device. Thus, when the optical system 10 is operating in the laser range finder mode, the signal generating system 16 generates a modulated infrared signal 20, and the amount of time it takes for the detector 32 to receive a reflected version 24, 28 of the modulated signal 20 is representative of the distance between the rifle (or other aimable device) and the target. The signal generating system 16 and the detector 32 may be operatively interconnected to correlate the output 58 of the detector 32 to the operation of the signal generating system 16. A system for providing the desired correlation and a suitable display (not shown) may also be mounted on the rifle, binoculars, etc.

Further, additional light energy 70 for the outgoing beam 22 may be supplied by a second power source 72. The second power source 72 may be used to assist in the infrared illuminator mode, for example. The light energy 70 is transmitted through the large diameter core 60 of the input/output fiber 14 (upwardly as viewed in FIG. 3), and is reflected by the front side 54 of the notch 30 toward the output end 26 of the transmission fiber 12. The large diameter core 60 and the first cladding 42 can support transmission of a large amount of energy. Consequently, by transmitting the additional energy 70 through the multi-mode core 60 and the cladding 42, a larger amount of energy can be directed toward the output end 26 than would be the case if all the energy had to be transmitted through a smaller diameter, single mode core.

In operation, the additional energy 70 is substantially confined within the multi-mode core 60 by the cladding layer 62 of the input/output fiber 14, and subsequently the additional energy 70 is substantially confined within the first cladding 42 of the transmission fiber 12 by the second, lower-index buffer layer 44. The additional energy 70 may be side pumped into the input/output fiber 14 by means of a notch (not shown) located along the length of the input/output fiber 14. The side pumping notch in the input/output fiber 14 may be constructed and operated in the manner described in the Goldberg '865 patent. The present invention should not be limited to the constructions described herein, however. Alternative means may also be employed for launching the additional energy 70 from the second source 72 into the transmission fiber 12. For example, a second notch or prism (not shown) may be formed in the transmission fiber 12. The second notch or prism may be connected directly to the second source 72 for side pumping additional infrared light into the fiber 12 in the manner described in the Goldberg '865 patent.

Figure 4:
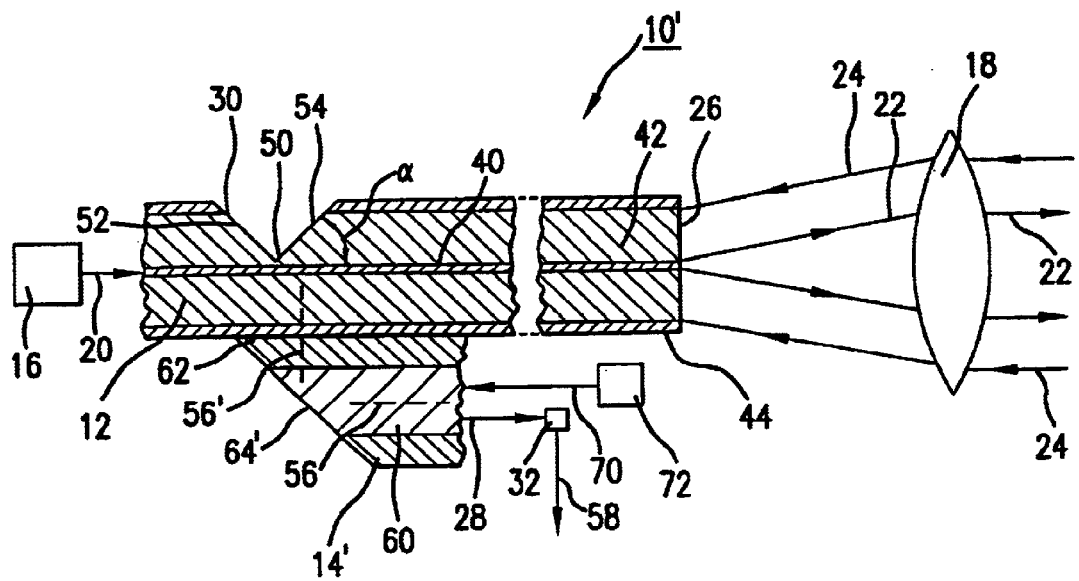
FIG. 4 is a cross-sectional view of another optical system constructed in accordance with the present invention.

Referring now to FIG. 4, there is shown another optical system 10' constructed in accordance with the present invention. In the optical system 10', the end 64' of the input/output fiber 14' is cut and polished to form an angle of 45° with respect to the optical axis 56 of the input/output fiber 14'. The input/output fiber 14' may be located parallel and adjacent to the transmission fiber 12. Thus, in operation, the return light 24, 28 is reflected off the interface 54 and propagates along a reflection axis 56'. The reflection axis 56' may be orthogonal to the optical axis of the transmission fiber 12. The reflection axis 56' may be arranged to intersect the optical axis 56 of the input/output fiber 14' at the center of the polished end 64'. Consequently, the return light 24, 28 is reflected by the polished end 64' toward the detector 32 along line 28. Additional light 70 is propagated through the input/output fiber 14' in a direction that is from right to left as shown in FIG. 4. The additional light 70 is reflected by the polished end 64' and propagates along the reflection axis 56'. Thus, the additional light 70 is reflected into the cladding 42 of the transmission fiber 12 by the reflective interface 54. The input/output fiber 14' may be fixedly connected to the transmission fiber 12 by a suitable transparent adhesive or the like. The index of refraction of the adhesive (not shown) may be arranged to match those of the outer claddings 62, 44 of the two fibers 12, 14' to reduce or eliminate reflection at the outer surfaces of the fibers 12, 14. The system 10' of FIG. 4 is otherwise constructed the same as and may be operated essentially the same as the system 10 of FIGS. 1–3.

Reference has been made to preferred embodiments in describing the invention. However, additions, deletions, substitutions, or other modifications which would fall within the scope of the invention defined in the claims may be implemented by those skilled in the art without departing from the spirit or scope of the invention. Accordingly, the invention is not to be considered as limited by the foregoing description, but is only limited by the scope of the appended claims.

What is claimed as new and desired to be protected by Letters Patent of the United States is:

1. An optical system comprising:
    a signal generating system generating a modulated light signal, and an optical transmission fiber that receives said modulated light signal,
    said optical transmission fiber comprising:
        a core for transmitting said modulated light signal in a first direction toward an exit end;
        a first cladding for transmitting a second light signal in a second direction, said second direction being opposite to said first direction;
        a second cladding for substantially confining said second light signal in said first cladding;
        an optical element substantially collimating said modulated light received from said exit end of said core; and
        a device located with respect to said first cladding that directs substantially only said second light signal into a second optical fiber.

2. The transmission fiber of claim 1, wherein said core has an index of refraction, and wherein said first cladding has an index of refraction, and wherein the index of refraction of said core is greater than the index of refraction of said first cladding.

3. The transmission fiber of claim 2, wherein said core has a diameter that is not greater than about ten microns.

4. The transmission fiber of claim 3, wherein said second cladding includes a polymer buffer.

5. The transmission fiber of claim 4, wherein said polymer buffer has an index of refraction, and wherein the index of refraction of said first cladding is greater than the index of refraction of said polymer buffer.

6. The transmission fiber of claim 5, wherein said device includes a notch formed in said first cladding.

7. The transmission fiber of claim 6, wherein said notch does not extend into said core.

8. An optical system comprising:
   an optical transmission fiber having a core and a first cladding;
   a signal generating system for launching a transmission signal into said core in a first direction;
   an optical input/output fiber having a core positioned to receive from said cladding of said transmission fiber substantially only a return signal traveling in a direction opposite said first direction and to transmit light to said cladding traveling in said first direction, and wherein said core of said input/output fiber has a greater diameter than said core of said transmission fiber, and
   a source of said light.

9. The system of claim 8, wherein said transmission fiber has a second cladding for substantially confining said return signal in said first cladding.

10. The system of claim 9, wherein said second cladding includes a polymer buffer.

11. The system of claim 10, wherein said transmission fiber includes a reflective surface for directing said return signal out of said first cladding and into said core of said input/output fiber, and wherein said reflective surface is located in said first cladding.

12. The system of claim 8, wherein said input/output fiber is connected to a dise of said transmission fiber.

13. The system of claim 12, further comprising a detector connected to said core of said input/output fiber for detecting said return signal.

14. The system of claim 8, wherein said signal generating system is arranged to launch multiple light signals having different wavelengths into said core of said transmission fiber.

15. The system of claim 8, further comprising a lens device for transmitting said transmission signal in a direction away from an end of said transmission fiber, and wherein said lens device is arranged to converge said return signal onto said end of said transmission fiber.

16. The system of claim 8, wherein said input/output fiber has a cylindrical end surface.

17. The system of claim 8, wherein said input/output fiber is parallel to said transmission fiber.

18. The system of claim 8, wherein a reflective end portion of said input/output fiber is adjacent said transmission fiber, such that said return signal is reflected into said input/output fiber.

19. The system of claim 18, wherein said end portion forms an angle with respect to the optical axis of said input/output fiber to reflect light from said input/output fiber into said transmission fiber.

20. A method of operating an optical system, said method comprising the steps of:
   generating a modulated light signal;
   propagating said modulated light signal through a core of a single mode transmission fiber in a first direction;
   collimating said modulated light signal from said core and directing said modulated light signal so collimated to a target;
   propagating a second light signal comprising said modulated light signal returned from said target through a cladding portion of said transmission fiber in a second direction, said second direction being opposite said first direction; and
   directing substantially only said second light signal into a core of a multi-mode input/output fiber, wherein the diameter of said core of said input/output fiber is larger than the diameter of said core of said transmission fiber.

21. The method of claim 20, further comprising the step of using a detector to detect said second signal.

22. The method of claim 20, further comprising the step of using a polymer buffer to substantially confine said second signal in said cladding portion of said transmission fiber.

23. The method of claim 20, further comprising the step of operating said system while said system is mounted on an aimable device.

24. An optical system comprising:
   an optical transmission fiber having a core and a first cladding;
   a signal generating system for launching a transmission signal into said core in a first direction; and
   an optical input/output fiber having a core for receiving a return signal from said cladding of said transmission fiber, and wherein said core of said input/output fiber has a greater diameter than said core of said transmission fiber, and
   further comprising a lens device for collimating and transmitting said transmission signal in a direction away from an end of said transmission fiber, and wherein said lens device is arranged to converge said return signal onto said end of said transmission fiber.

25. An optical system comprising:
   an optical fiber having an end and comprising a core configured to conduct first optical energy in a first direction along said optical fiber to said end and a cladding configured to conduct second optical energy in a second direction along said optical fiber that is opposite said first direction; and
   an optical element adjacent to said end and configured to collimate and transmit said first optical energy toward a target and to direct incident optical energy from said target onto said end as said second optical energy.

26. An optical system according to claim 25 further comprising means for diverting at least some of said second optical energy to a detector.

27. An optical system according to claim 25 further comprising a prism formed in said cladding and arranged to divert at least some of said second optical energy to a detector.

28. An optical system according to claim 25 further comprising a second optical fiber arranged to receive said some of said second optical energy.

29. An optical system according to claim 28 wherein said second optical fiber is a multi-mode fiber.

30. An optical system according to claim 25 further comprising an optical energy generating system generating said first optical energy and optically coupled to said core, said optical energy generating system providing one or a plurality of optical beams.

31. An optical system according to claim 30 further comprising a second optical energy generating system optically coupled to said cladding and generating a second optical beam for transmission through said cladding to said end.

32. An optical system according to claim 31 wherein said second optical beam is infrared.

33. An optical system according to claim 32 further comprising a second optical fiber optically coupled to said cladding and means for diverting at least some of said second optical energy to a detector through said second optical fiber.

34. An optical system according to claim 33 wherein said second optical energy generating system is optically coupled to said second optical fiber.

35. An optical system according to claim 25 wherein the maximum transverse dimension of said core is less than about 10 microns, and the maximum transverse dimension of said cladding is more than about 80 microns.

36. An optical system according to claim 25 wherein said optical fiber includes a second cladding.

37. An optical system comprising:

an optical transmission fiber having a core and a first cladding;

a signal generating system for launching a transmission signal into said core in a first direction; and an optical input/output fiber having a core for receiving from said cladding of said transmission fiber substantially only a return signal traveling in a direction opposite said first direction, wherein said core of said input/output fiber has a diameter greater than said core of said transmission fiber, a reflective end portion of said input/output fiber is adjacent said transmission fiber such that said return signal is reflected into said input/output fiber, and said reflective end portion forms an angle with respect to the optical axis of said input/output fiber to reflect light from said input/output fiber into said transmission fiber.

38. An optical system comprising:

an optical fiber having an end and comprising a core configured to conduct first optical energy in a first direction along said optical fiber to said end and a cladding configured to conduct second optical energy in a second direction along said optical fiber that is opposite said first direction; and an optical element adjacent to said end and configured to transmit said first optical energy toward an object and to direct incident optical energy onto said end as said second optical energy;

an optical energy generating system generating said first optical energy and optically coupled to said core, said optical energy generating system providing one or a plurality of optical beams, and a second optical energy generating system optically coupled to said cladding and generating a second optical beam for transmission through said cladding to said end.

39. An optical system according to claim 37 wherein said second optical beam is infrared.

40. An optical system according to claim 39 further comprising a second optical fiber optically coupled to said cladding and means for diverting at least some of said second optical energy to a detector through said second optical fiber.

41. An optical system according to claim 40 wherein said second optical energy generating system is optically coupled to said second optical fiber.

* * * * *